JAMES B. ANGELL
ROBERT N. NOYCE
HARLEY A. PERKINS JR.
INVENTORS
BY Roger S. Borovoy
ATTORNEY

JAMES B. ANGELL
ROBERT N. NOYCE
HARLEY A. PERKINS
INVENTORS

BY Roger S. Borovoy
ATTORNEY

JAMES B. ANGELL
ROBERT N. NOYCE
HARLEY A. PERKINS
*INVENTORS*

BY [signature]
*ATTORNEY*

JAMES B. ANGELL
ROBERT N. NOYCE
HARLEY A. PERKINS
INVENTORS
BY Roger S. Borovoy
ATTORNEY JAMES B. ANGELL
ROBERT N. NOYCE
HARLEY A. PERKINS
INVENTORS
BY Roger S. Borovoy
ATTORNEY June 13, 1967 J. B. ANGELL ETAL 3,325,787

TRAINABLE SYSTEM

Filed Oct. 19, 1964

8 Sheets-Sheet 6

JAMES B. ANGELL
ROBERT N. NOYCE
HARLEY A. PERKINS
INVENTORS

BY Roger S. Borovoy
ATTORNEY

JAMES B. ANGELL
ROBERT N. NOYCE
HARLEY A. PERKINS
INVENTORS
BY Roger S. Borovoy
ATTORNEY JAMES B. ANGELL
ROBERT N. NOYCE
HARLEY A. PERKINS
INVENTORS
BY [signature]
ATTORNEY

United States Patent Office 3,325,787

Patented June 13, 1967

3,325,787

TRAINABLE SYSTEM

James B. Angell, Portola Valley, and Robert N. Noyce and Harley A. Perkins, Jr., Los Altos, Calif., assignors to Fairchild Camera and Instrument Corporation, Syosset, N.Y., a corporation of Delaware Filed Oct. 19, 1964, Ser. No. 404,760
14 Claims. (Cl. 340—172.5)

ABSTRACT OF THE DISCLOSURE

A trainable pattern recognition system wherein input pattern signals are sent to a computer to be summed and combined with gain values received from a magnetic drum and compared with a desired output. The adaptive linear elements on the drum each have adjustable gain values stored as a word on the drum so that adjusted gain values can replace previously stored gain values during training. The drum rotation is synchronized with the input signals.

This invention relates to a data processing system and more particularly to an adaptive computer system wherein the adaptive behavior is based on a magnetic drum that cooperates with a synchronized means, such as a video camera or speech processor.

Within the past few years, there has been an upsurge in the study and development of adaptive computer systems. Adaptive systems may be generally described as systems whose internal structure is altered in accordance with specified procedures in order to achieve improved performance. One special class of adaptive systems are trainable systems, in which performance is altered by a training procedure. The value of trainable systems in pattern recognition (for example, printed or handwritten characters, speech, medical diagnosis, whether prediction) has already been demonstrated.

Typically, trainable systems include many adaptive memory components, each of which provides a permanent but alterable analog memory with nondestructive readout. Two such prior art components are the memistor, an electrochemically variable resistor, and a magnetic adaptive component employing second-harmonic readout, both described in "Aerospace Engineering," vol. 21, No. 9, September 1962, pages 121–123 (hereinafter referred to as Reference 1). The memistor is high in cost, slow in response, and unable to provide drift-free permanent memory. The magnetic adaptive component employs tape-wound cores which are expensive and heavily power consumptive for readout and training. The lack of a suitable adaptive component has somewhat discouraged the development of large-scale adaptive systems. There is a strong need for large scale adaptive systems, which have the required variable gain with permanent memory but which overcome the above disadvantages.

Trainable systems are not programmed like conventional digital computers; they must be trained. Training these systems is very much like teaching a student. The adaptive computer is trained to solve problems by supplying examples of typical problems to the computer; the solution is then graded correct or incorrect. If the solution by the computer is incorrect, its internal structure is altered by changing the value of the gains of the adaptive elements. For example, if an adaptive machine is used for pattern recognition, it is first set with its individual components having arbitrarily selected gains. An input pattern is supplied. The system provides an output which may be typically either of two values, +1 or —1. If the system has an output of +1 and the desired or correct output is +1, then the arbitrarily selected gains of the individual components are adequate to recognize this input pattern without adjustment of the gains.

Supposing now a second different pattern is supplied to the input means and the output is again +1 while the desired output is —1. According to one training procedure, the gains of the individual components are each adjusted in an equal amount in a direction which would tend to make the system output a —1. The first and second patterns would again be supplied to the input means and hopefully the system output would have the desired value in both instances. If the actual and desired outputs do not agree, then the gain values of the individual components would again be adjusted and the procedure continued until the system is "trained." If this procedure for recognizing two signal patterns be expanded to recognize the multiplicity of patterns, the training procedure becomes time consuming, as the adjustment procedure must be repeated many times.

The lack of a practical adaptive memory component for large scale systems capable of rapidly recognizing a multiplicity of patterns is a serious problem. This invention solves this problem by combining an input means, such as a camera, for supplying an input to a computer or data processing system with a magnetic means or drum means having its operation or rotation synchronized with the operation of the camera means. In usual computer environments, using a drum means implies a low cost approach where speed of operation is secondary in importance. When the invented set up is employed in an adaptive system, the speed of adaptation and gain value storage capacity rivals performance of the most elaborate high performance general purpose digital computers that may be employed to simulate an adaptive system. This is accomplished at drastically lowered cost and complexity. The combining of an input means, such as cameras and speech processors, with a magnetic drum means is an important aspect of this invention and while it is especially significant in an adaptive system, it alone is a potent data processing tool.

In the specific trainable pattern recognition system considered here, the camera means functions to provide input signals to the system at a very high rate, and it usually derives these signals from two-dimensional representations or patterns. The magnetic drum means is divided into a plurality of tracks. A subset of these tracks, for example eight of them, serves as a storage medium for a large number of gain values, or weights, associated with a single adaptive linear element (normally termed an "adaline"). The weights are stored circumferentially along the tracks; the subset of tracks provides multi-digit storage (for example, with the precision of eight binary digits if there are eight tracks per subset) for each of the weights. Thus, one weight is stored as a word in a small portion of each track of the subset of tracks. During training the words representative of gain values are read from the magnetic drum means and each is combined with a synchronized signal from the camera means. The combined gain values and camera inputs are summed and compared with a desired output. If the sums do not adequately conform to the desired output, the weight values are adjusted and the adjusted weight values replace the values that were previously stored on the magnetic drum means. In this way, the words on the magnetic drum means function to provide the components having variable gain with permanent, but alterable, memory and nondestructive readout. The adaptive memory component of this invention meets all the basic functional requirements. The component is fast, low cost, easily manufactured, reliable, and uses little power. In addition, the camera means, which has its input signals derived in synchronism with the gain value readout, conveniently supplies the adaptive system with a rapid input. This input arrangement along with other logic circuitry overcomes the difficulty previously encountered in training an adaptive system.

Briefly, the structure of the invention comprises a means for generating an information input signal, a magnetic storage means for storing a plurality of gain values, each stored gain value occupying a discrete position in the magnetic storage means, readout means coupled to the magnetic storage means for readout of the gain values from the magnetic storage means and for generating an output signal representative of the gain values, synch means operatively coupled between the information signal generating means and the magnetic storage means to synchronize the information signal generating means with the readout by the readout means, A/D converter means coupled to the information signal generating means for converting the input signal therefrom to a digital output signal, and computer means for performing a logical operation on a plurality of inputs, the outputs of the A/D converter means and the readout means coupled to the input of the computer means to supply a plurality of inputs, whereby the information signals and the stored gain values are processed.

The above discussed structural features and advantages, along with a number of other significant structural features and advantages, will be readily understood from the detailed written description which follows, taken in conjunction with the drawings, wherein.

At the outset, it is to be emphasized that this invention is a system invention and the particular components utilized and their specific details are relatively unimportant. The components that form the system are conventional and well known in the computer arts. Throughout the specification, reference will be made to "Digital Computer Design" by Edward L. Braum, Academic Press, 1963 (hereinafter referred to as Reference 2), and to "Computer Handbook" by G. A. Korn and H. D. Huskey, McGraw-Hill Book Co., Inc., 1962 (hereinafter referred to as Reference 3), as well as to patents and other publications which set forth typical prior art components that may be adapted for use in this system. While these references may specify certain electronic or solid state components, it is within the broad aspect of the invention to utilize electro-mechanical, electronic, solid state, magnetic, superconductive, integrated circuits or any other components, as desired.

Figure 1:
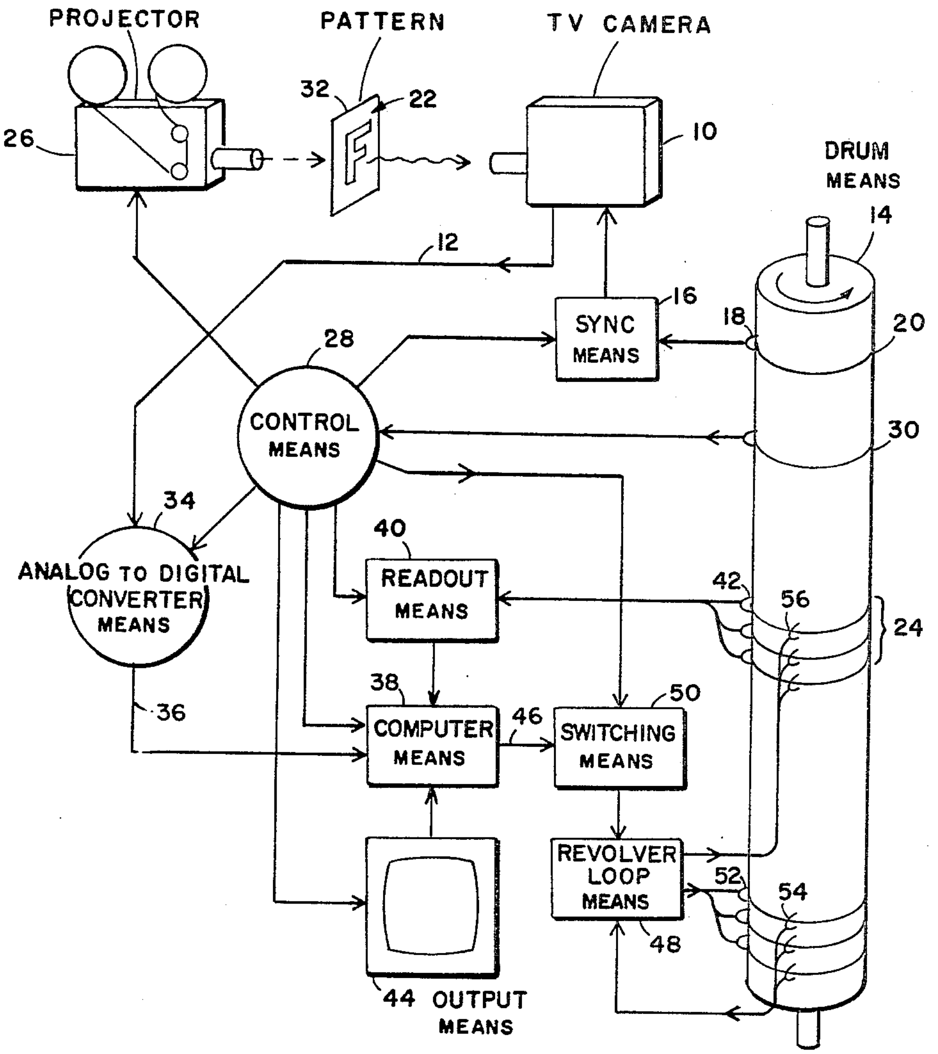
FIG. 1 is a block diagram of a data processing system utilizing the invention.

The general system arrangement is shown in FIG. 1. At the heart of this system is an information input means, such as optical scanning or camera means 10 which has its output 12 synchronized with the operation or rotation of a magnetic drum means 14 by a sync means 16. In the preferred embodiment of the invention, the magnetic means 14 takes the form of a rotatable magnetic drum means, and has therefore been called "drum" in FIG. 1; however, magnetic means 14 may alternatively take the form of a rotating magnetic disc, a magnetic tape loop or other similar digital or binary storage means. Sync means 16 cooperates with a transducer means 18 associated with drum 14. Transducer means 18 is a magnetic transducer head operatively coupled to a synchronizing track 20. Transducer means 18 may be constructed from notched or etched discs and magnetic or photo-electric devices or other similar transducer means that are commonly used to sense rotation.

Magnetic drum means 14 is conventional and generally comprises an oxide coated rotating cylinder divided into many minute areas which may be selectively magnetized to store binary digits or "bits" representing information. These areas are defined by first dividing the drum into a plurality of narrow tracks or channels, each extending along the periphery or circumference of the drum. Each track is sub-divided circumferentially or peripherally into slots, or bits. A number of bits in side by side relationship on adjacent tracks comprise a binary or digital word. These words are recorded on the drum and subsequently read off by magnetic heads associated with the various tracks. Each track may have a reading head and a recording head, each positioned adjacent to the cylinder and aligned with the track. Alternatively, one record head may be provided for each track to perform both the reading and recording function. Magnetic drum means and associated synchronizing tracks are more thoroughly considered in U.S. Patent 2,797,402 issued to R. T. Duffey on June 25, 1957.

Sync means 16 which is connected to transducer means 18 and track 20 generates a control voltage to enable the camera means 10 to scan in synchronism with the rotation of magnetic drum means 14. The control voltage generated by sync means 16 causes the camera means to scan one input pattern during one revolution of drum means 14. Using a video camera, an input pattern, such as pattern 22, may be scanned using sixty lines, each line having seventy bits of information. Such a scanning arrangement gives rise to 4,200 bits of information for each pattern. One pattern 22, giving rise to one field, requires $\frac{1}{60}$ of a second. To be compatible with this scanning rate, the drum means should rotate at the rate of 3,600 revolutions per minute, or one revolution every $\frac{1}{60}$ of a second. This rate enables a complete frame or pattern 22 to be scanned during each revolution of magnetic drum means 14. More important, sync means 16 enables each bit or spot on pattern 22 to be related to a particular word weight value or gain value recorded on the information tracks 24. This will be further considered later in the specification. Since the term "camera means" is used in a broad sense, it should be understood that other optical means, such as the one shown in U.S. Patent 3,084,334 issued April 2, 1963, may be used. It should also be understood that the pattern 22 may be representative of any data that can be reduced to a pattern. For example, the spoken word has been represented as an optical pattern. In some systems it will be preferred to have the pattern size and intensity normalized. Where the input means is other than optical, then it may be desirable to normalize the input signal by logical means, although AGC circuits and other adaptive devices may be suitable for normalization of certain signals.

Input pattern 22 is supplied to camera means 10 by an automatic projector 26 which is controlled by a control means 28. The control means 28 has one of its outputs connected to automatic projector 26 to supply an input pattern to screen 32 at an appropriate time. Input pattern 22 is then scanned by camera 10, as controlled by the sync means 16, which in turn is precisely controlled and synchronized with the projector 26 by control means 28. Control means 28, which has one of its outputs connected to projector 26, may typically take the form of a clock generator means for controlling the timing and synchronization of the various components of the data processing system. Such clock generator means are well known in the art and may include a timing track 30 on magnetic drum means 14. Various arrangements of control means including a magnetic drum means, are well known in the art as shown in U.S. Patent 3,090,944 issued to J. J. Keilsohn et al. on May 24, 1963.

The output of camera means 10 is connected to a computer means, to be described later. If this computer means is digital, the output of camera means 10 is connected through an analog-to-digital (A/D) converter means 34 for generating a binary signal or more generally a multilevel quantized signal representative of the analog signal supplied by camera means 10. If the computer means, however, is an analog computer, the A/D converter may obviously be eliminated. The analog computer means will operate directly on the analog signal supplied by camera means 10. A/D converters are well known in the art, as described in Reference 3 on pages 6–44. These A/D converters may generate a binary or binary coded output signal, or they may simply generate a +1 signal if the output 12 of camera means 10 is above a first given value and a −1 if the output is below this given value. This +1 or −1 mode of operation is considered in this description for the purpose of simplification. Control means 28 is connected to A/D converter means 34 to enable it to operate in a timely manner.

Output 36 of A/D converter means 34 is connected to a computer means 38, for performing some sort of logical or arithmetical operation on the output signal from the A/D converter means 34 together with another input signal supplied by a readout means 40 which is also connected to the input of computer means 38. Readout means 40, which is operatively coupled to tracks 24 by a plurality of magnetic head transducers 42, functions to supply a recorded bit, word or gain value from drum means 14 to computer means 38. The words are supplied in synchronism with the input bits supplied by the camera means via A/D converter means 34. Control means 28, connected both to readout means 40 and computer means 38, assures that the timing of these components are maintained, but sync means 16 is the primary device for controlling synchronism. In a typical construction, the words on track 24 have addresses running from 1 to 4,200 (in binary designation); each of the spots supplied during the scanning of a pattern by camera means 10 also have a designation from 1 to 4,200. Readout means 40 supplies the word designated at address 1 at approximately the same instant that converter means 34 supplies the digital representation of the spot with address 1. Computer means 38 then performs a logical operation upon the inputs supplied. Computer means 38 may perform multiplication, addition, subtraction, a logical operation, or any other of the operations that are so common to computers. In addition, computer means 38, readout means 40, or converter means 34 may include buffer means for temporary storage to facilitate timing. The only important aspect is that a given word should be processed with a given bit.

Computer means 38 has one of its outputs connected to an output means 44 while another output 46 is connected to a revolver loop means 48 through a switching means 50. Output means 44 may take the form of a meter, register, or preferably a television receiver or monitor. Control means 28 is connected to output means 44. In the case of a TV receiver, control means 28 insures the TV is scanned in proper phase with the scanning of camera means 10. Control means 28 is also connected to switching means 50 which is shown as a controlled switch wherein a pulse from control means 28 closes the circuit between output 46 of computer means 38 and the input to revolver loop means 48. Preferably, switching means 50 is a solid state switching circuit, such as a silicon controlled rectifier.

Revolver loop means are well known in the art as evidenced by Reference 3, pages 20–7 to 20–10. Revolver loops are also commonly referred to as circulating loops or high speed loops. These devices are used to facilitate access to and from a particular track of information, such as tracks 24. In the system shown in FIG. 1, revolver loop means 48 includes a first set of write transducers 52 and a second set of read transducers 54 which are operatively coupled to the drum 14. A third set of transducers 56, also included in the revolver loop means, are operatively coupled to tracks 24 to enable the words from drum 14 which are processed by computer means 38, to be reinserted into tracks 24 in the exact position from whence they came. These transducers may also function as write heads for the original storage of information on the drum 14. In the preferred embodiment, the closing of switch means 50 will cause transducers 52 to record the information processed by computer means 38. This recorded information is read out an instant later by transducers 54 and reinserted by transducers 56 at the exact same position on tracks 24 where it was originally stored. The reinsertion may be accomplished during the same revolution of drum 14 in which the original readout occurred.

In operation, a word is read out from drum 14 by readout means 40 and supplied to computer means 38. Simultaneous with this readout operation, camera means 10 scans an input pattern and supplies a bit of information to the computer means 38 for each word that is read from tracks 24. Computer means 38 performs a combining or logical operation upon these two inputs and supplies an output to output means 44. Alternatively or conjunctively, an output is supplied to a revolver loop means 48 which stores the computed results in the plurality of tracks 24 at the exact position that the readout word was previously stored.

The above described system emphasizes the broad aspects of the invention—that is, the combination of a camera means or means for scanning a visual representation that operates in synchronism with a storage means, or more particularly, a magnetic drum means. This combination provides a potent data processing tool that enables the pattern or visual representation to readily modify or be combined with values stored in a storage means. Combining this data processing tool with a revolver loop means enables the modified version of the value that was stored in the memory means to be restored at the same address from which it was read out during the same revolution of the drum. The advantages and utility of the data processing system described in FIG. 1 is particularly well suited for use in an adaptive or trainable data processing system. Such a system is shown in FIGS. 2 through 5. It should be noted that control means 28 is omitted from FIG. 2 for the purpose of simplification. It is understood a control means will provide the timing signal necessary to coordinate the transfer of data from element to element as described above with reference to FIG. 1.

Figure 2:
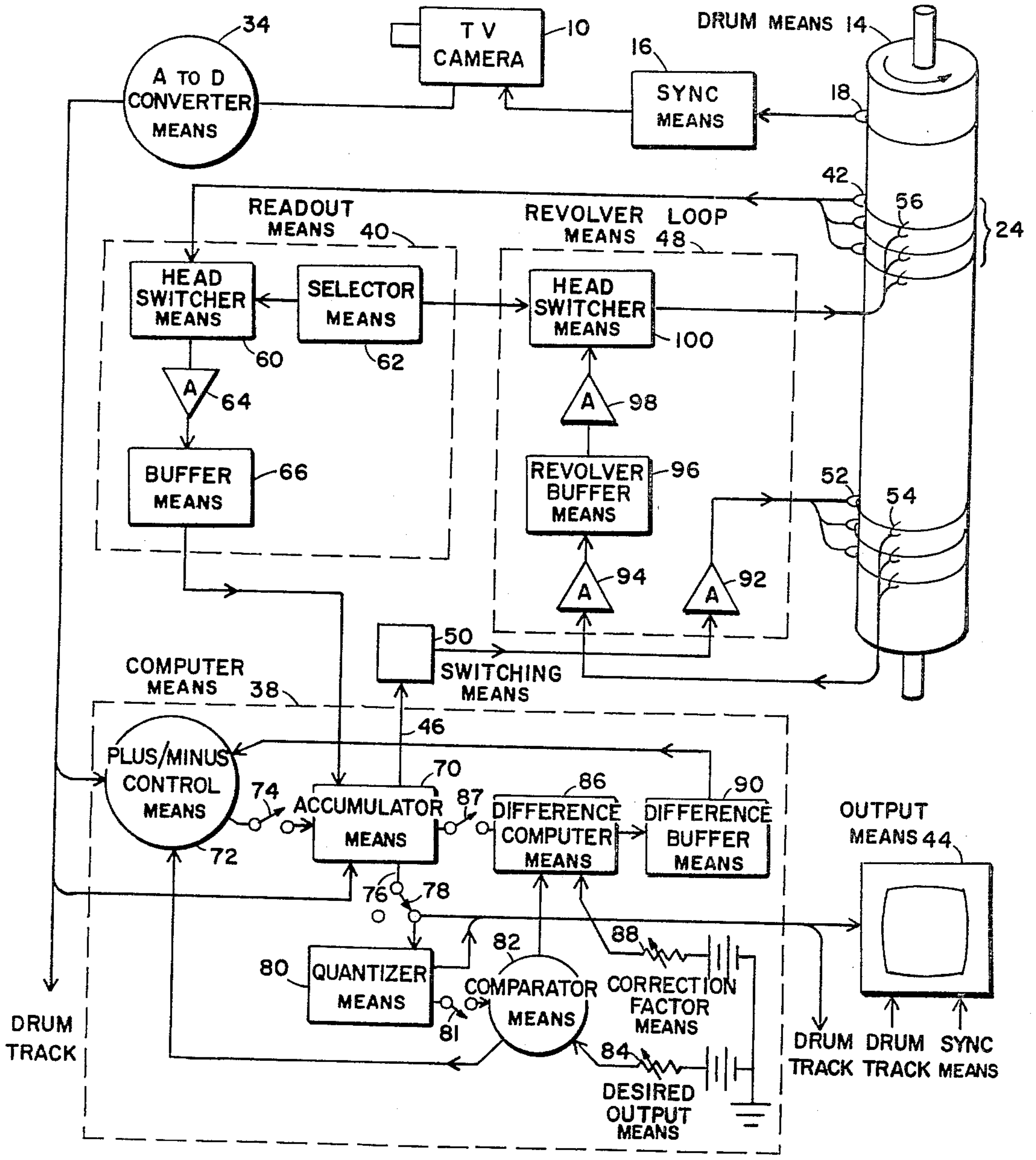
FIG. 2 is a block diagram similar to the one shown in FIG. 1, but showing a computer means and revolver loop means that would be used in an adaptive system.

In the trainable or adaptive system of FIG. 2, magnetic drum means 14 forms the basis for storage (memory) of many adaptive components. Each word on a plurality of tracks represents a component, or structural member that is subject to change or adaption according to experiences; each such word is a permanent memory element, thereby fulfilling the requirements of an adaptive component. It should be noted that the adaptive component of this invention, as contrasted with the magnetic adaptive component and the memistor (see Reference 1) of the prior art, is a digital or binary component rather than an analog component. Each such adaptive component is made up of a number of bits; in a typical configuration, one component would comprise 8 bits of information. Typically, 4,200 of these eight-bit adaptice components are stored around the periphery or circumference of drum 14 to make up an adaline. Each of these 4,200 words has a counterpart input bit or spot generated by camera means 10. A typical adaptive system would comprise twenty such adalines—that is, twenty-eight track members, each including 4,200 eight-bit words. At typical bit packing densities of 240 bits per inch of track and twenty-five tracks per inch of drum, a drum six inches in diameter and eight inches long would more than suffice. In addition to the adalines, such a drum provides tracks for eight revolver loops, one or two TC scan synchronizing tracks, one to five time synchronizing tracks, and perhaps an input pattern storage track and other miscellaneous tracks.

Readout means 40 is coupled to these tracks 24 by transducer heads 42 to readout the plurality (or eight) tracks simultaneously (only three tracks are shown for the purpose of simplicity). Since only the eight heads associated with the adaline being read out are active at any given instant, a first head switcher means 60 is included in readout means 40 to select the proper group of heads. Head switcher means are well known in the art and are disclosed in such articles as "Magnetic Recording Head Selector Switch," by C. D. Ceader, IBM Journal of Research and Development, No. 2, pages 36–42 (1958) and "High Speed Track Selection for a Magnetic Drum Store," by A. D. Booth, No. 32, pages 209–211 (1960). The head switcher means 60 enables transducer heads or a bank of such heads to be enabled in a predetermined manner and in predetermined sets. An adaptive element selector means 62 enables head switcher means 60 to select the proper set of transducer heads 42 at the proper time. The output from head switcher means 60 is connected to amplifier means 64 which is in turn connected to a buffer or a buffer storage means 66 which temporarily stores the data for further processing. Buffer means 66 provides the input for computer means 38 and enables the transfer of data or information from drum means 14 to computer means 38 in a timely manner. Buffer means are well known in the art and are discussed in Reference 2 on pages 180–186.

Sync means 16, camera means 10, and A/D converter means 34 operate in the identical manner described with reference to FIG. 1. Sync means 16 maintains the scanning of an input pattern or visual representation by camera means 10 in synchronism with the rotation of drum 14. The output of the camera means is transmitted to computer means 38 by A/D converter means 34 and forms a second input thereto. Computer means 38 therefore has two inputs, one a weight or gain value from magnetic drum means 14, and the other a synchronized bit from camera means 10 which in turn is related to a visual representation or pattern.

Computer means 38 in the adaptive computer system has two modes of operation. One mode is generally referred to as the recognition or compute mode of operation, while the other mode is referred to as the adaption or training mode of operation. During the recognition phase of operation, computer means 38 combines the input from camera means 10 with an appropriate word from drum 14 and sums these combinations. The sum in the specific case being considered is the summation of 4,200 weight values on a track such as 24 with the appropriate input bit from camera means 10 combined therewith. The combination of the camera bit and the gain value may be a multiplication, an addition, or merely the designation of the gain values as a + or − value according to the output of the A/D converter means 34. The sum of the 4,200 or so words may then be quantized either on a multiple level basis or merely at two levels, such as a +1 or −1. The quantized value comprises one output bit in a multi-bit word. In the case of a twenty adaline system, the quantized sum is one word in a twenty-bit word. Each adaline of 4,200 gain values forms one bit. The summation procedure of computer means 38 is repeated for each of the twenty adalines and consequently a twenty-bit word results.

In adaption or training mode of operation, computer means 38 functions to sum and quantize the adaline output as described above and the quantized output is then compared with a desired output. If these two outputs do not favorably compare or conform, the computer means then adjusts or changes the weight values of that adaline stored on track 24. To accomplish this adjustment, computer means 38 generates a correction factor for each of the words of track 24 and applies this correction to each of the 4,200 words. This training procedure is repeated for each of the twenty adalines. With this general background of the recognition and training modes of operation in mind, a detailed description of computer means 38 with reference to the specific structure shown in FIG. 2 is in order.

The output of the A/D converter means 34 is connected to an accumulator means 70 and to a plus-minus or sign control means 72. Control means 72 is connected to accumulator means 70 via a normally open switch means 74. Switch means 74 is only enable during the gain value adjustment phase of the training mode of operation. The functioning of control means 72 will be considered later in the specification with reference to the structure that is significant during the gain adjustment phase. Accumulator means 70 has inputs both from A/D converter means 34 and from buffer means 66. Accumulator means 70 combines each bit (or bits) of information from converter means 34 with the appropriate word from buffer means 66 and successively sums the combined bits and words, generating a signal representative of the summation at output 76, which includes a normally closed switch means 78. In the embodiment of FIG. 2 the combination of the bit and gain value assigns a sign (+ or 1) to the gain values. Accumulators are well known in the computer art and are discussed in Reference 2, pages 275–315 and in the article "Fast, High Accuracy Binary Parallel Addition," by H. C. Hendrickson, IRE Transactions EL, vol. 9, pages 465–469 (1960).

Output 76 of accumulator means 70 is connected through normally closed switch 78 to quantizer means 80 and also the output means or output display means 44. Quantizer means 80 generates one of a plurality of levels depending on the magnitude of input from accumulator means 70. Typically, quantizer means 80 will generate a +1 or −1, depending on the level of the signal transmitted from accumulator means 70.

Quantizer means 80 has one output connected to a comparator means 82 via a normally open switch means 81 and another output connected directly to the output means 44. Switch means 81 is only closed during the training mode of opeartion. Comparator means 82 in addition to the input from quantizer means 80, has an input from desired output means 84. Desired output means 84 supplies a signal representative of the output that adaline 24 would produce at the quantizer means output if adaline 24 were properly trained. If the desired output and the output from quantizer means 80 are substantially different, comparator means 82 coupled to a difference computer means 86 generates an output signal that enables difference computer means 86.

Difference computer means 86 has a second input supplied from the accumulator means 70 via a normally open switch means 87 which is closed during the training mode of operation. A third input is supplied to the difference computer means 86 from a correction factor means 88 that adjusts the output of the difference computer means 80. The output of difference computer means 86 is coupled to a difference buffer means 90. When an input from accumulator means 70 and comparator means 82 is supplied to difference computer means 86, an output related to the input of correction factor means 88 is generated at the output of difference computer means 86 and temporarily stored in difference buffer means 90.

Difference buffer means 90 has its output connected to control means 72. Control means 72 functions to determine whether the correction signal stored in difference buffer means 90 must be added to or subtracted from the stored gain values that are transmitted to accumulator means 70 during the adjustment phase of the training mode. This function is facilitated by the input from A/D converter means 34 and the input from comparator means 82. Comparator means 82 supplies a signal which indicates whether the quantized value from quantizer means 80 is greater than or less than the desired output. The input from converter means 34 typically indicates whether the value of the bit from camera means 10 is a +1 or −1. If the signal from comparator means 82 indicates that the quantized output is too great, then control means 72 causes the gain or weight values associated with a −1 input from converter means 34 to become larger by adding the correction value stored in difference buffer means 90 to the gain value supplied to accumulator means 70 by buffer means 66. If the value from converter means 34 is a +1, then the input from comparator means 82 indicating the quantized output is too great will set control means 72 to reduce the gain value associated with this +1 value. A subtraction of the value stored in difference buffer means 90 from the gain value supplied to accumulator means 70 will therefore occur. This process is continued to adjust each of the 4,200 gain values in the adaline 24.

The adjusted values from accumulator means 70 and more generally from computer means 38 are connected to revolver loop means 48, and more specifically to amplifier 92 via switching means 50 which is enable (as discussed in connection with FIG. 1) only during the training mode of operation. Amplifier 92 is coupled to the drum 14 by a magnetic head transducer means 52. It should be understood that in an adaline having eight bit words, amplifier means 92 is adapted to process an eight-bit word, and magnetic transducer 52 to record such a word. The information recorded by magnetic transducer 52 is immediately or a short time thereafter read by a reproduce or read transducer 54 adapted to read an eight-bit word. Reproduce transducer 54 is coupled to an amplifier means 94 (also part of revolver loop means 48) which in turn is connected to a revolver buffer means 96. Revolver buffer means 96 normalizes the adjusted gain value that is being processed by revolver loop means 48 for re-recording same on tracks 24. At an appropriate time, the information from revolver buffer means 96 is transferred to write heads 56 via an amplifier 98 and a second head switcher means 100. Second head switcher means 100, like first head switcher means 60, is enabled by adaptive element selector means 62 in readout means 40. Selector means 62 enables the head switcher means 100 to connect amplifier 98 to the set of transducer heads 56 which are cooperatively coupled to the adaline being adjusted. The information from revolver buffer means 96 is transferred to adaline 24 at such a time that would enable the adjusted gain value to be stored in the same address or position from which it came.

Figure 3:
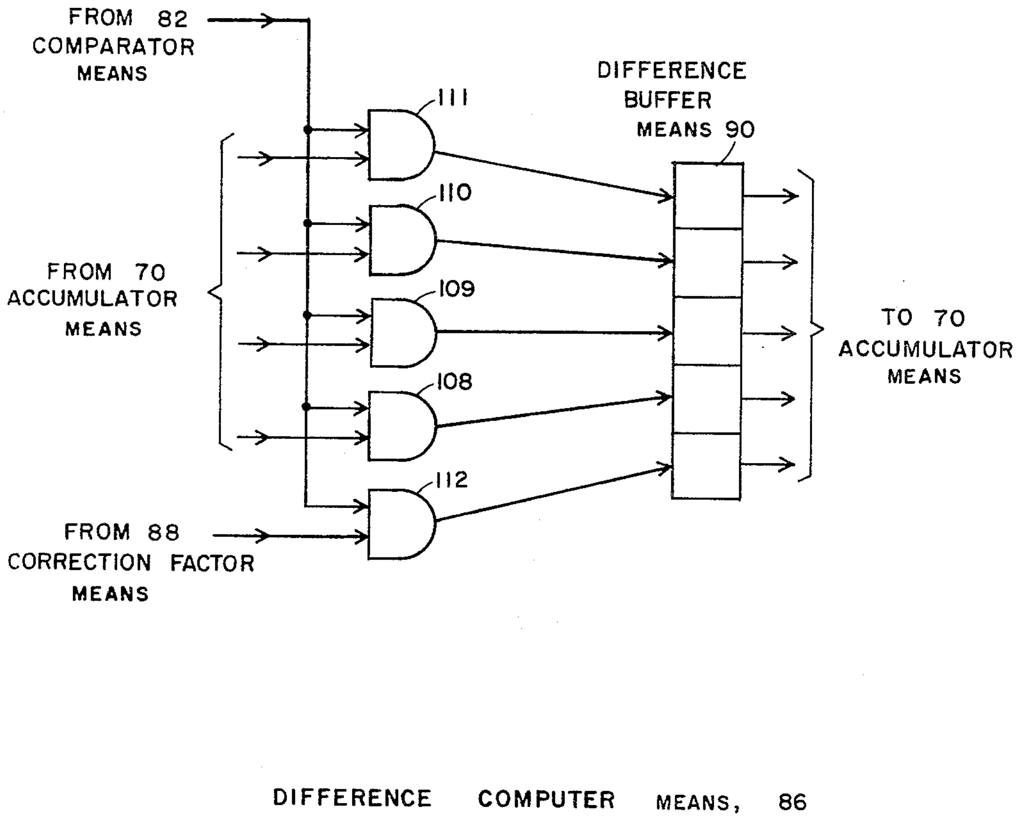
FIG. 3 is a simplified block logic diagram for the difference computer means shown in FIG. 2.

Before considering the operation of the system shown in FIG. 2 in its various phases of operation, it is well to consider a more specific embodiment of the difference computer means 86. Referring to FIG. 3, the difference computer means 86 in its simplest form comprises a group of "and" gates 108–111 with each of their inputs connected from a different bit or position of the accumulator means 70. In a typical case where the accumulator means 70 has fifteen bits, the twelfth to the fifteen bit may be connected to the "and" gates 108–111 respectively. The presence of an input signal to gate 108 from the twelfth bit of the accumulator would indicate the sum in the accumulator means 70 was at least 2,048; an input to the gate 109 would indicate a sum of at least 4,096; and so on. The "and" gates 108–111 also have a second input that is supplied by the comparator means 82. The "and" gates 108–111 will only transmit an output signal when input signals are provided from both the accumulator means 70 and the comparator means 82. For example, when inputs are provided to "and" gate 108 by the twelfth accumulator bit and by the comparator means 82, the difference computer 86 generates a correction signal. The existence of an input from comparator means 82 indicates that the quantized sum from the accumulator output does not agree with the desired output. The existence of an input from the twelfth bit of the accumulator indicates that a correction of at least 2,048 is necessary. This correction can be effected by transferring the "one" transmitted to difference buffer means 90 via gate 108 to each of the 4,200 gain values and correcting the gain values in the proper manner. Similarly, if the "and" gate 109 were enabled, the accumulator output value would indicate an error value of at least 4,096 and the correction by transferring the "two" value in the difference buffer means 90 to each of the gate values would result in a correction of 8,400.

It should be noted that by rearranging the interconnections between the gates 108–111, difference buffer means 90, and accumulator means 70, and by adding appropriate logic circuitry, other corrections can be obtained. The correction factor means 88 is schematically shown as accomplishing a different error correction by supplying an input to "and" gate 112 whose other input, like "and" gates 108-111, comes from comparator means 82. This in turn enables the shifting of the value stored in the difference buffer means 90 on place so that what was a "one" correction now becomes a "two" and so on. The shift only occurs when an input is also supplied by accumulator means 70.

Figure 4:
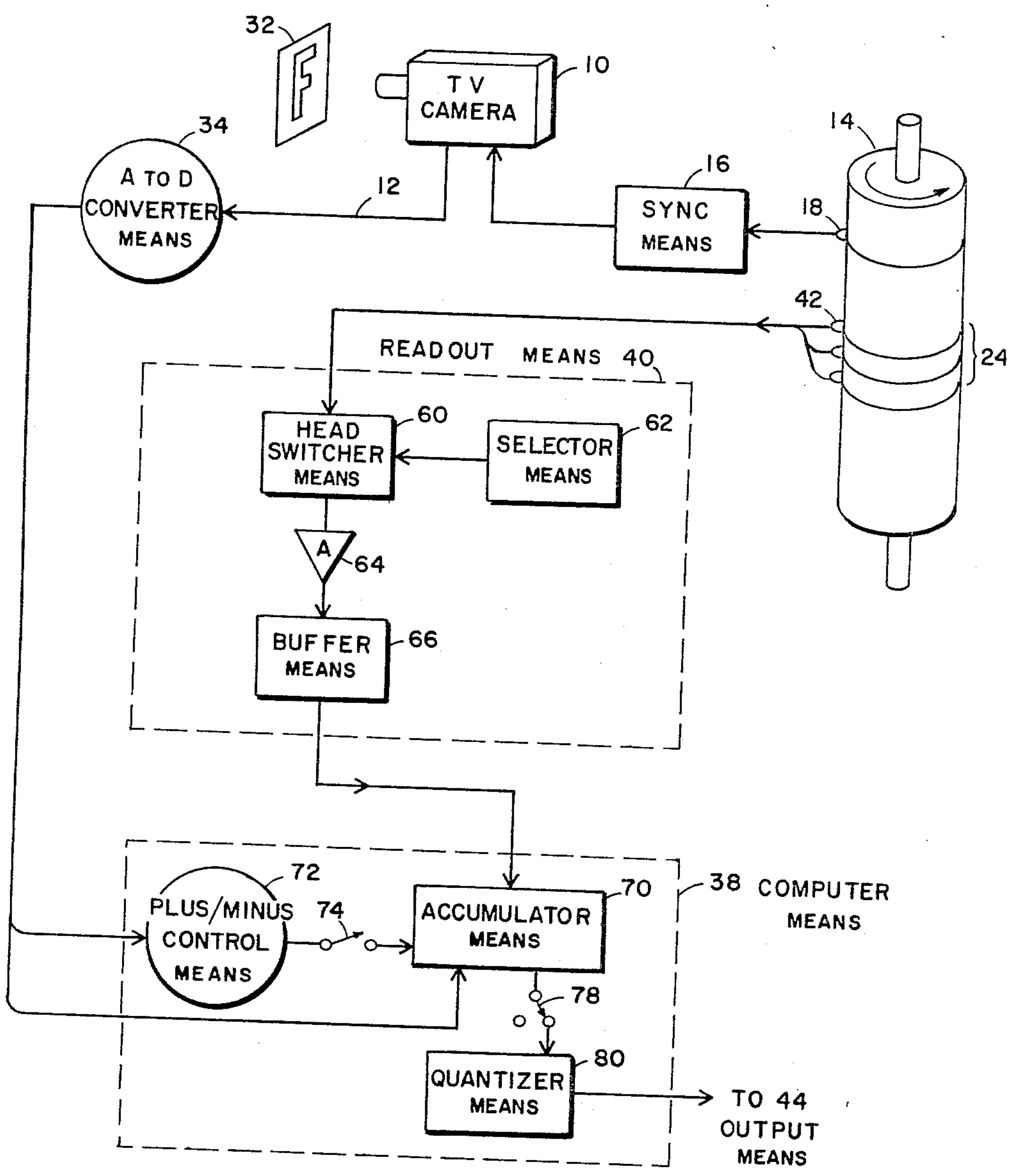
FIG. 4 is a block diagram showing part of the system of FIG. 2 that would be used in the recognition phase of system operation.

With the above organization of the system elements in mind, the operation of the system can readily be understood. Referring to FIG. 4, the part of the adaptive system of FIG. 2 most important during the recognition phase of operation is shown. During the recognition phase, the pattern to be recognized is displayed on screen 32. Camera means 10 scans screen 32 in synchronism with the rotation of drum 14 and with the readout by magnetic transducers 42 from an adaline 24 selected by head switcher means 60 as enabled by selector means 62. The input signals from camera means 10 representative of spots or bits of information are supplied to accumulator means 70 via A/D converter means 34 which translates the analog camera input into a +1 or −1 signal. Each of these camera inputs is processed with an appropriate word or gain value from the adaline 24 to determine whether the gain value is added or subtracted in the accumulator means 70. Accumulator means 70 combines the camera input and the gain values and sums the successively combined words. The summation of the scanning of one adailne results in an output from the accumulator means 70 which is supplied to quantizer means 80. Quantizer means 80 generates a +1 or −1 output which, according to a predetermined code, is representative of the pattern scanned on the screen 32. The foregoing processing of the pattern on screen 32 and the readout from an adaline will be repeated until all the adalines are processed. At the conclusion of this process, coded output will be displayed in output means 44 which will indicate the exact nature of the input pattern projected on screen 32.

Figure 5:
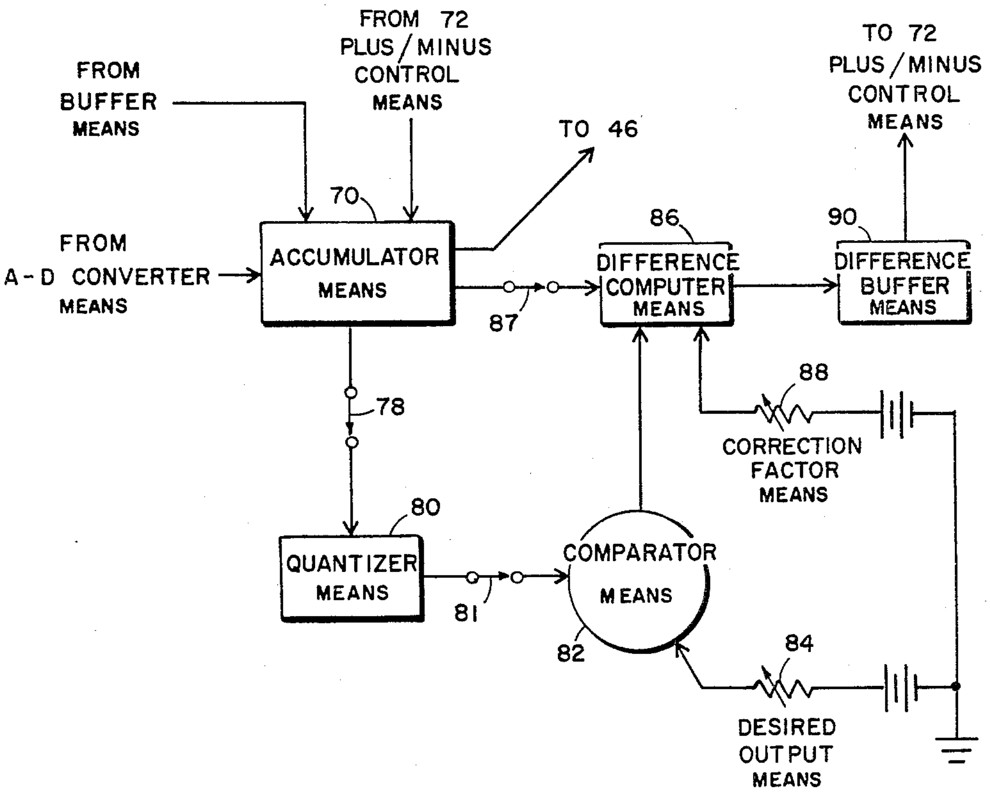
FIG. 5 is a block diagram showing part of the system of FIG. 2 that would be used during compute or gain value determination phase of system operation.
Figure 6:
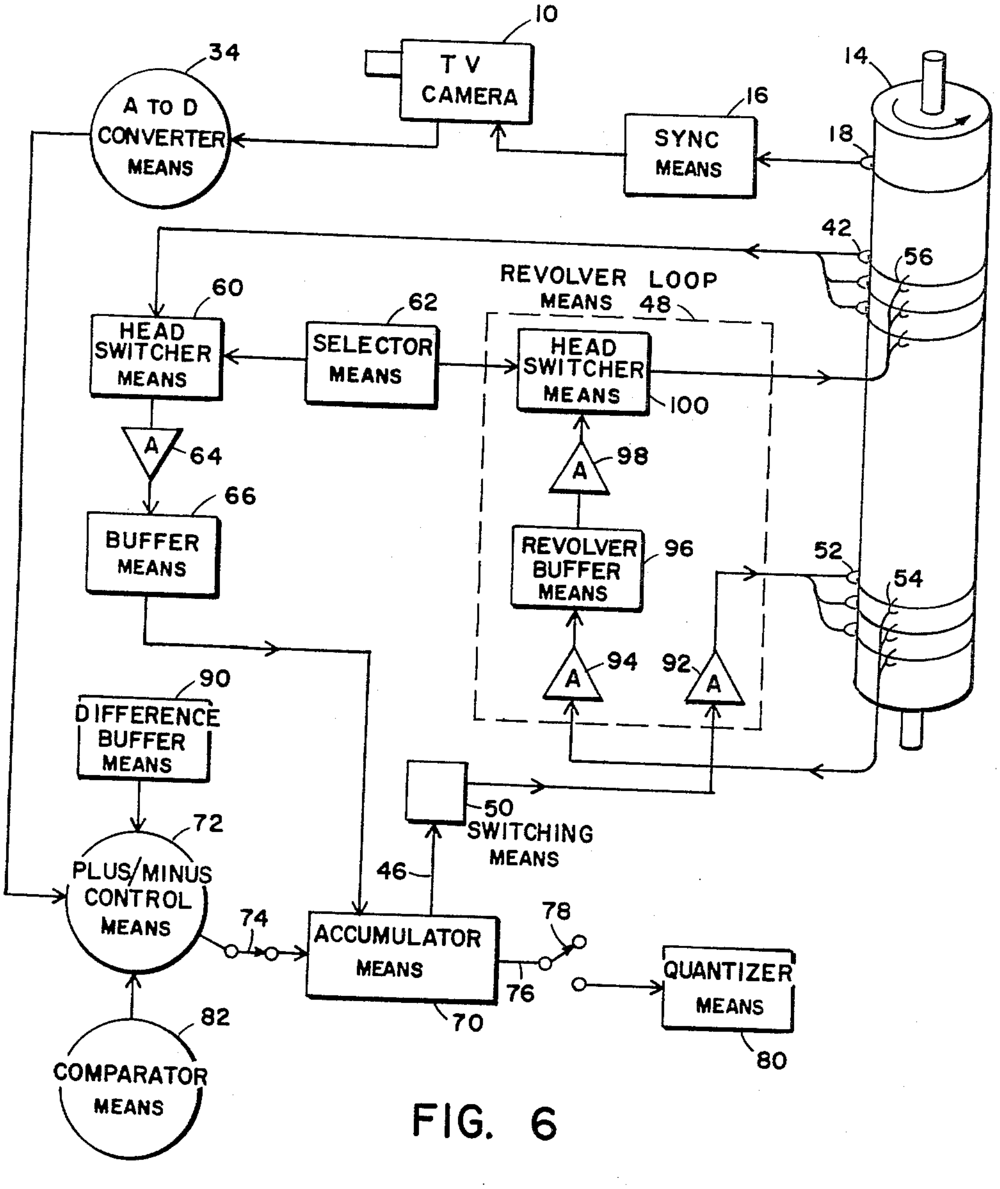
FIG. 6 is a block diagram of part of the system of FIG. 2 that is used during the actual gain value adjustment or modification phase of system operation.

In addition to the recognition phase of operation, the adaptive system has a training mode of operation which includes two phases of operation which are: (1) the gain or weight value adjustment determination phase; and (2) the adjustment of gain value phase. FIG. 5 shows the structure of FIG. 2 which is most significant during the gain value adjustment determination phase of operation. FIG. 6 shows the structure most significant during the gain adjustment phase of operation. Referring to FIG. 5, during the gain value adjustment determination phase, the inputs are supplied from drum 14 and camera means 10 to accumulator means 70 in the identical manner as described with reference to FIG. 4. During this phase, however, switch means 78, 81 and 87 are closed so that quantizer means 80 and difference computer means 86 are connected to the accumulator means 70 and comparator 82 is connected to quantizer means 80. The sum accumulated in accumulator means 70 is quantized to a +1 or −1 value by the quantizer means 80, and in turn compared by comparator means 82 with the desired output from desired output means 84. If the quantized output and the desired output are in agreement, no adjustment of the particular adaline being processed is necessary. If there is sufficient disagreement between the quantized output and the desired output, then comparator means 82 supplies a signal to difference computer means 86 which along with the input from accumulator means 70, activates difference computer means 86 to generate a correction signal in accordance with the setting of correction factor means 88. This correction signal is applied to difference buffer means 90 and is the gain adjustment that is to be applied to each word in the adaline that was just transmitted by the readout means. The adjustment to the gain values is accomplished during the gain adjustment phase of operation.

The structure most important during the gain adjustment phase of operation is shown in FIG. 6. Referring to FIG. 6, camera means 10 and drum 14 operate in the identical manner described in FIG. 4. Magnetic drum means 14 goes through a second revolution during the gain value adjustment phase of operation, while camera means 10 goes through a second scanning operation. During the adjustment phase of the operation, the correction signal stored in difference buffer means 90 is transferred to control means 72 substantially simultaneously with the input from A/D converter means 34. The plus-minus control means will assign a + or − value to the corection signal, depending on whether the signal from the converted means is a +1 or −1 and depending on the input from the comparator means 82. The correction signal with the proper sign is then transmitted from control means 72 to accumulator means 70 simultaneously with the transfer of a gain value related, or of the same address as the +1 or −1 signal transmitted by A/D converter means 34. Once the correction signal is applied to this word, it is removed from accumulator means 70 and transferred back to the address from which it was removed via revolver loop means 48. Revolver loop means 48 transfers the adjusted gain value to its proper address via the amplifier 92, transducer heads 52 and 54, amplifier 94, revolver buffer means 96, amplifier 98, and head switcher means 100. At the completion of this transfer, an adjusted weight value will exist at the proper storage position. This adjustment procedure is successively repeated on each of the 4,200 words that comprises each adaline. In a typical system wherein the drum means is rotated at 3,600 revolution per minute it would require 2 revolutions, or 1/30 of a second, to complete the adaption that is the adjustment determination and the actual adjustment of one adaline. An entire array of twenty adalines is adjusted in a little over 2/3 second.

Figure 7:
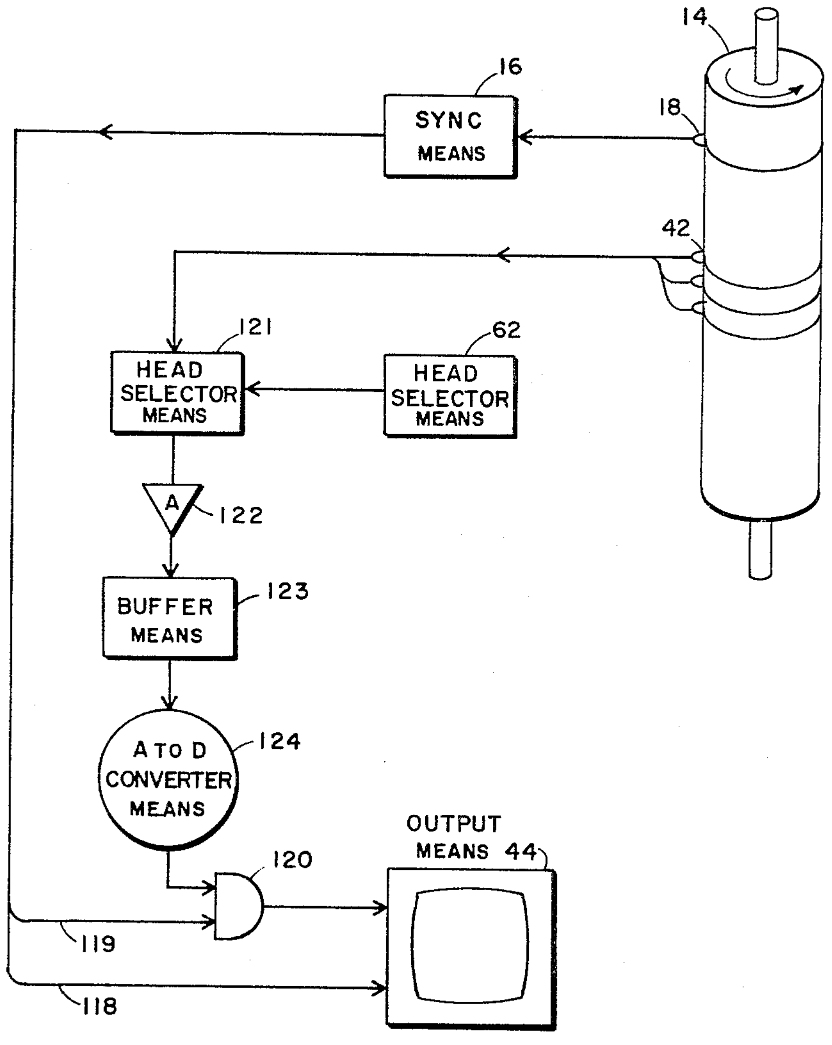
FIG. 7 is the block diagram of an arrangement for displaying the information stored on the magnetic drum means.

One additional feature of the system can readily be understood by reference to FIG. 7. The arrangement shown in FIG. 7 enables the gain values on the drum 14 to be read out and displayed on an output means such as a TV receiver or similar visual means. The provision of such a visual output means enables all the values of a particular adaline to be simultneously displayed and photographed or permanently reproduced. The permanent reproduction of the values stored on the adapted magnetic drum means may then be used in conjunction with a lens and a photocell detector to form a very simple and inexpensive optical pattern classifier. Further, such an output arrangement provides a very convenient way to analyze the system's response to a problem situation in detail.

The system of FIG. 7 essentially comprises sync means 16 (as previously discussed). The sync means 16 is coupled to the drum 14 by a transducer 18 and is also connected to an "and" gate 20 and to output display means 44. The connection 118 between sync means 16 and output display means 44 enables the output display to be scanned in synchronism with the rotation of the drum 14. The connection 119 of sync means 16 to "and" gate 120 enables the readout of gain values to be transferred to the electron gun of the display means 44. The other input to "and" gate 120 is series circuit formed by a head switcher means 121 followed by an amplifier 122, a buffer means 123, and and D/A converter means 124. A head selector means essentially identical with the adaptive element selector means 62 of FIG. 2 is connected to an input switch means 121. Another input of switcher means 121 is connected to transducer means 42 on drum 14 (as described earlier).

In operation, drum 14 rotates and the gain values from a particular adaline are read out via head switcher 121, amplifier 122, and buffer means 123 to a D/A converter means 124 which converts the digital signal to the analog form. This readout is accomplished in synchronism with the rotation of drum 14 by the sync means 16, which, along with D/A converted means 124, forms an input to the "and" circuit 120 to enable the analog to be transmitted to the receiver 44. Receiver 44 displays an analog signal representative of the gain values and is scanned across in synchromism with the rotation of drum 14. It should be noted that the receiver 44 also may display other significant system quantities, such as accumulator sums and quantized values. The accumulator sums and input patterns may be temporarily stored on a track of drum 14 and then subsequently supplied to the receiver 44 or other system components.

The invention in its broadest aspect includes inputs other than optical means. Vitually any information signal generating means may replace the optical input means. It should be recognized that a television camera is broadly a means for generating a signal representative of an image. An input signal supplied by an audio transducer, such as a microphone, which functions as a means for generating a signal representative of sound information may replace the camera 10 of FIG. 1. Similarly other transducers may be employed in the system.

Figure 8:
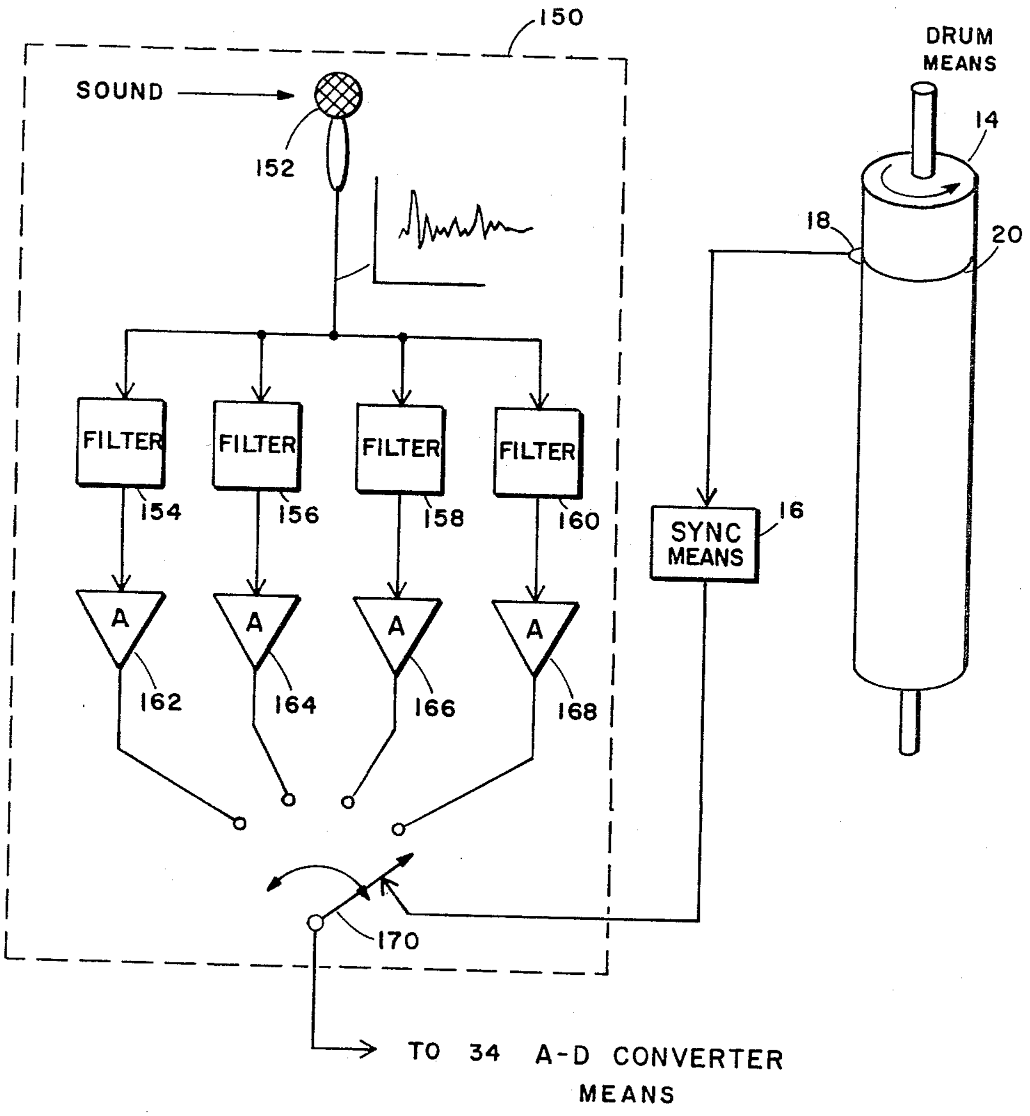
FIG. 8 is a block diagram of an embodiment of the invention wherein an audio input means replaces the optical input means in the system shown in FIG. 1.

In FIG. 8 a simplified alternate embodiment employing an audio signal input means 150 is shown. Audio means 150 includes a sound transducer 152, a plurality of filters 154–160, gated amplifiers 162–168 and switch means or sampler 170. The transducer 152 converts a sound wave into an electrical information signal which is then split into a number of frequency bands by the filters 154–160. The filters 154–160 are then sampled by the switch 170 which periodically connects the output of each filter to the A/D converted means 34. A normalizing means may be included in the system to standardize the length of a syllable or word, and detector-integrators along with quantizers may be coupled to the filters in a specific embodiment. The switch 170 may be a solid state electronic, electrical or mechanical device that is adapted to be controlled by the sync means 16. It will be recalled from the preceeding description that the sync means 16 is in turn connected to the drum means 14. From this it can be seen that varied frequencies of the audio information signals are sampled in synchronism with the operation of the drum means 14. This signal is then processed by the remaining portions of the adaptive system as explained above in regards to FIGS. 1 and 2. An audio means 150 for voice or sound recognition is described in greater detail in the report "A Real-Time Adaptive Speech Recognition System," by L. R. Talbert et al., Stanford Electronics Laboratories Report SEL–63–064, Technical Documentary Report No. ASD–TDR–63–660 (May 1963). Thus, an audio input means or any other information signal generating means may be utilized in accordance with the board principles of the invention.

In summary, a unique combination comprising an information signal generating means, such as a camera means, and synchronized drum means has been described. This combination forms a valuable data processing element that may be employed with special utility in adaptive systems wherein the magnetic drum and the camera form the basis for a digital adaptive system that operates in a serial manner. The magnetic drum adaptive components may be formed into adalines having 4,200 weight values and more than 20 adalines may be placed on a relatively small drum. This large capacity is realized at relatively low costs. In addition, the output of a TV receiver enables an adaptive magnet drum to be readily reproduced and so makes the fabrication of even lower pattern recognition systems possible.

While specific and preferred embodiments of the invention have been shown and described, other embodiments and modifications of the present invention will be obvious to those skilled in the art. These modifications and embodiments may be accomplished without departing from the spirit and scope of the invention as defined in the attached claims.

What is claimed is:

1. In a data processing system wherein visual representations form the input information, the combination comprising camera means coupled to the source of said information for scanning said representations and for supplying an output signal in response thereto, a rotatable magnetic drum means for storing a plurality of gain values, each stored gain value occupying a plurality of tracks and constituting an adaptive element, readout means coupled to said drum means for successively reading out said gain values from said drum means during rotation of said drum means and for generating an output signal representative of said gain values, sync means coupled between said camera means and said drum means for generating a sync signal to synchronize the scanning of said camera means with the readout by said readout means, and a computer means coupled to said readout means and said camera means for performing a logical operation on a plurality of inputs, whereby said visual input representations and said stored gain values are processed.

2. In an adaptive computer system wherein the input takes the form of patterns, the combination comprising camera means coupled to said input for scanning said input patterns in a line-by-line manner, each line containing a finite number of spots, and for supplying an output signal representative of said scanned pattern, a rotatable magnetic drum means for storing a plurality of gain values, said drum means divided into a plurality of circumferential tracks, each of said stored values occupying a plurality of said tracks and constituting a digital adaptive element, readout means coupled to said plurality of tracks on said drum means for reading out the gain values from said drum means during the rotation of said drum and for generating a digital output signal representative of said gain values, sync means coupled between said drum means and said camera means for generating a sync signal in synchronism with the readout from said drum means to synchronize the scanning of said camera means with said readout so that each spot is correlated with a gain value, A/D converter means for converting the output of said camera means to a digital signal, said converter means coupled to said camera means, and a computer means having inputs coupled to said readout means and said converter means for combining the gain values with the appropriate output signal from said converter means, whereby input information representative of finite portions of the input patterns are processed in conjunction with the stored gain values of said drum means.

3. The structure device in claim 2 wherein said computer means: (a) combines a plurality of output signals from said converter means with the appropriate output signal from said readout means; (b) sums the said combined output signals; and (c) generates a quantized signal representative of said summed output signals.

4. In a data processing system wherein visual representations form the input information, the combination comprising a camera means for scanning said representations and for supplying an output signal in response thereto, said camera means coupled to the source of said visual representations, a rotatable magnetic drum means divided into a plurality of circumferential tracks for storing a plurality of gain values, each stored gain value occupying a plurality of tracks and placed around the circumference of said drum means, readout means coupled to said drum means for reading the gain values from said drum means during the rotation of said drum and for generating a plurality of output signal representative of a plurality of said gain values, sync means coupled between said drum means and said camera means for generating a signal in synchronism with the readout of a gain value from said drum means and for enabling said camera means to generate an output signal each time said readout means provides an output signal representative of a gain value, A/D converter means coupled to said camera means for converting the output signal from said camera means to a digital output signal, computer means for: (a) combining the output signals of said converter means with the appropriate output signal of said readout means for summing a plurality of said combined signals; (b) for comparing the summed combined signals with a desired output signal; and (c) for generating corrected gain values when said summed combined signals and said desired output signal fail to adequately conform, and a revolver loop means coupled between said computer means and said drum means for storing the corrected gain values at their appropriate position on said plurality of tracks on said drum means, whereby the stored gain values on said drum means are modified when they fail to conform to the desired output.

5. The structure defined in claim 4 further characterized by means for visually displaying given signals and for displaying said drum contents is included in said system, and a sync means coupled to said output means and to said drum means for synchronizing said output display with said drum means rotation.

6. In the data processing system wherein visual representations form the input information, the combination comprising a camera means for supplying an input signal to said system, said camera means coupled to the source of said visual representations, a magnetic storage means for storing a plurality of gain values, each stored gain value occupying a discrete position in said magnetic storage means, readout means coupled to said magnetic storage means for read out of said gain values from said magnetic storage means and for generating an output signal representative of said gain values, sync means operatively coupled between said camera means and said magnetic storage means for generating a sync signal to synchronize said camera means with the readout by said readout means, A/D converter means coupled to said camera means for converting said camera means output to a digital output signal, and computer means for performing a logical operation on a plurality of inputs, the outputs of said analog-digital converter means and said readout means coupled to the input of said computer means, whereby signals representative of said visual inputs and said stored gain values are processed.

7. In a data processing system wherein visual representations form the input information, the combination comprising optical scanning means coupled to the source of said visual representations for scanning said visual representations and for supplying an input signal to said system representative of said scanned representations, a storage means for storing a plurality of words, each word occupying a discrete position in said storage means, readout means coupled to said storage means for readout of said words from said storage means, and for generation of an output signal representative of said words, sync means coupled between said storage means and said scanning means for generating a sync signal to synchronize said scanning means with the readout by said readout means, converter means for conforming the outputs from said scanning means and said storage means to enable said outputs from said scanning means to be processed, and computer means for performing a logical operation on a plurality of inputs, said scanning means and said readout means operatively coupled to said computer means so that the output signal from said scanning means and said readout means form inputs to said computer means, whereby signals representative of said visual input representations and said stored words are processed.

8. In a data processing system wherein visual representations form the input information, the combination comprising optical scanning means coupled to the source of said visual representations for scanning said visual representations and for supplying an input signal to said system representative of said scanned representation, a storage means for storing a plurality of words, each word occupying a discrete position in said storage means, readout means coupled to said storage means for readout of said words from said storage means and for generation of an output signal representative of said words, sync means coupled between said storage means and said scanning means for generating a sync signal to synchronize said scanning means with the readout by said readout means, and converter means for conforming the outputs of said scanning means and said storage means for processing.

9. In a data processing system wherein visual representations from the input information, the combination comprising camera means coupled to the source of said visual representations for scanning said representations and for supplying an analog output signal, a magnetic means for storing a plurality of digital words, each stored word occupying a discrete position in said magnetic means, readout means coupled to said magnetic means for readout of said words from said magnetic means and for generation of an output representative of said words, sync means for generating a sync signal to synchronize said camera means with the readout by said readout means, whereby each of said words read is correlated with an input from said camera means.

10. In a data processing system wherein visual representations form the input information, the combination comprising camera means coupled to the source of said visual representations for scanning said representations and for supplying an output signal, a rotatable magnetic drum means for storing a plurality of words, each stored word occupying a plurality of tracks across said drum means, readout means coupled to said drum means for successively reading out said words from said drum means during rotation of said drum means and for generating an output signal representative of said words, sync means for generating a sync signal to synchronize said camera means with the rotation of said drum means, whereby said camera means scans said visual representations in synchronism with the rotation of said drum means.

11. In a data processing system wherein visual representations form the input information, the combination comprising camera means coupled to the source of said visual representations for scanning said representations and for supplying an output signal, a rotatable magnetic drum means for storing a plurality of words, each stored word occupying a plurality of tracks across said drum means, readout means coupled to said drum means for successive readout of said words from said drum means during rotation of said drum means and for generating an output signal representative of said words, sync means for generating a sync signal to synchronize said camera means with the rotation of said drum means whereby said camera means scans said visual representations in synchronism with the rotation of said drum means, A/D converter means coupled to said camera means for converting the output of said camera means to a digital output signal, and computer means for performing a logical operation or a plurality of inputs, the outputs of said A/D converter means and said readout means coupled as inputs to said computer means, whereby signals resulting from the scanning of said visual representations and said stored words are processed.

12. In a data processing system, the combination comprising display means for visually displaying an output in the form of a multiplicity of spots, a rotatable magnetic drum means for storing a plurality of gain values, each stored gain value occupying a plurality of tracks and constituting an adaptive element, readout means coupled to said drum means for successively reading out said gain values from said drum means during rotation of said drum means and for generating an output signal representative of said gain values, sync means coupled between said drum means and said display means for generating a sync signal to synchronize said display means with the readout by said readout means, and D/A converter means coupled to said display means for converting the output signal from said readout means and said drum means to an analog output signal, whereby said gain values are displayed on appropriate spots of said display means.

13. In a data processing system, the combination comprising a means for generating an information input signal, a magnetic storage means for storing a plurality of gain values, each stored gain value occupying a discrete position in said magnetic storage means, readout means coupled to said magnetic storage means for readout of said gain values from said magnetic storage means and for generating an output signal representative of said gain values, sync means operatively coupled between said information signal generating means and said magnetic storage means to synchronize said information signal generating means with the readout by said readout means, and computer means for performing a logical operation on a plurality of inputs, the outputs of said signal generating means and said readout means coupled to the input of said computer means, to supply a plurality of input whereby the information signals and the storaged gain values are processed.

14. The structure recited in claim 13, wherein said information signal generating means comprises a sound transducer for converting a sound wave into a electrical signal, a filter means operatively coupled to said transducer for splitting said electrical signal into a plurality of frequency bands, and a switch means operatively coupled to said filter means, said sync means, and said A/D converter means for periodically sampling said frequency bands in synchronism with the readout from said magnetic storage means.

No references cited.

ROBERT C. BAILEY, *Primary Examiner.*

R. ZACHE, *Assistant Examiner.*